United States Patent
Odaohhara (10) Patent No.: US 8,687,338 B2
(45) Date of Patent: Apr. 1, 2014

(54) SYSTEMS AND METHODS FOR ENHANCED PROTECTION SYSTEMS FOR STORAGE BATTERIES

(75) Inventor: Shigefumi Odaohhara, Kanagawa-Ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 605 days.

(21) Appl. No.: 12/839,666

(22) Filed: Jul. 20, 2010

(65) Prior Publication Data
US 2011/0019326 A1    Jan. 27, 2011

(30) Foreign Application Priority Data
Jul. 21, 2009  (JP) .................................. 2009-169904

(51) Int. Cl.
*H02H 5/04*  (2006.01)

(52) U.S. Cl.
USPC ............... 361/104; 320/134; 320/136; 429/7; 429/61; 429/62; 429/90; 429/91; 429/92

(58) Field of Classification Search
USPC ......... 320/134, 136; 429/7, 61, 62, 90, 91, 92
See application file for complete search history.

(56) References Cited

U.S. PATENT DOCUMENTS

| | | | |
|---|---|---|---|
| 7,710,070 B2 * | 5/2010 | Mori et al. | 320/112 |
| 7,952,330 B2 * | 5/2011 | Mori | 320/150 |

FOREIGN PATENT DOCUMENTS

| | | |
|---|---|---|
| JP | H10-056742 | 2/1998 |
| JP | H10-136581 | 5/1998 |
| JP | 2000-340267 | 12/2000 |
| JP | 2006-269437 | 5/2006 |
| JP | 2007-123129 | 5/2007 |
| JP | 2007-207940 | 8/2007 |

* cited by examiner

*Primary Examiner* — Rexford Barnie
*Assistant Examiner* — Tien Mai
(74) *Attorney, Agent, or Firm* — Ference & Associates LLC (57) ABSTRACT

A highly reliable protection element for a storage battery is provided. A protection element includes a low melting point metal body and heater elements. The low melting point metal body is connected to a charger side line and a storage battery side line of a charge/discharge circuit. The heater element is connected to the storage battery side line and a switch, and the heater element is connected to the charger side line and a switch. When the switches are operated, a voltage that is not affected by a voltage drop of the low melting point metal body is applied to one of the heater elements, so that the low melting point metal body can be reliably fused.

20 Claims, 4 Drawing Sheets

Prior Art

SYSTEMS AND METHODS FOR ENHANCED PROTECTION SYSTEMS FOR STORAGE BATTERIES

CLAIM FOR PRIORITY

This application claims priority from Japanese Patent Application No. 2009-169904, filed on Jul. 21, 2009, and which is fully incorporated by reference as if set forth herein.

BACKGROUND

Portable electronic devices such as a laptop personal computer (laptop PC), a PDA (Personal Digital Assistant), and a mobile phone may carry a battery pack that includes a secondary battery, often termed a storage battery. The storage battery supplies power to a system load of the electronic device, and is typically charged by a charger mounted in a main body of the electronic device. A charge/discharge circuit inside the battery pack is provided with a protection element formed of a low melting point metal material for disconnecting the storage battery from the charge/discharge circuit when an abnormal condition occurs in the storage battery during charge or discharge.

Japanese Patent Application Laid-Open No. 2007-123129 discloses a protection element capable of reliably blowing a fuse by a heating resistor even when a voltage of a battery included in a battery pack varies widely. This protection element includes a low melting point metal that is fused when heated and a heating resistor that is thermally coupled to the low melting point metal and heats the low melting point metal with Joule heat generated by a current applied to the heating resistor. The heating resistor is connected with a switch that is turned on to cause the current to flow when an abnormal condition occurs in the storage battery. Japanese Patent Application Laid-Open No. 2000-340267 describes a constant current circuit for controlling a current flowing through a heater element within a fixed range. Japanese Patent Application Laid-Open No. 2006-269437 describes a protection element including one heater element connected to a central terminal of a low melting point metal body.

Typically, a charge/discharge circuit in a battery pack is provided with a return-type protection circuit that maintains safety of the battery pack by turning a switch off upon detecting that an abnormal condition occurs in the battery pack during charge or discharge. The return-type protection circuit allows for return if the abnormal condition of the battery pack is removed after the operation. Since high safety is required of the battery pack, a non-return-type protection element (hereafter simply referred to as a protection element) that interrupts the charge/discharge circuit by fusing a low melting point metal with Joule heat is also provided as a backup in the case where the return-type protection circuit does not operate properly. The protection element serves as a final protection device when the return-type protection circuit does not operate properly, and therefore is required to operate with high stability and reliability.

BRIEF SUMMARY

The subject matter described herein relates to a technique for enhancing the reliability of a storage battery protection element. More specifically, the subject matter is directed toward enhancing the reliability of a storage battery protection element comprised of a low melting point metal body and a heater element.

One aspect provides an apparatus comprising: one or more charge/discharge units; one or more switch circuits; a plurality of power electrodes connectable to the one or more charge/discharge units; a plurality of control electrodes connectable to the one or more switch circuits; a low melting point metal body, wherein a first end of the low melting point metal body is connected to a first power electrode and a second end of the low melting point metal body is connected to a second power electrode; a first heater element configured to be thermally coupled to the low melting point metal body, wherein a first end of the first heater element is connected to the first power electrode and a second end of the first heater element is connected to a first control electrode; and a second heater element configured to be thermally coupled to the low melting point metal body, wherein a first end of the second heater element is connected to the second power electrode and a second end of the second heater element is connected to a second control electrode.

Another aspect provides a method comprising: providing a plurality of power electrodes connectable to one or more charge/discharge units; providing a plurality of control electrodes connectable to one or more switch circuits; connecting a first end of a low melting point metal body to a first power electrode and a second end of the low melting point body to a second power electrode; thermally coupling a first heater element and a second heater element to the low melting point metal body; connecting a first end of the first heater element to the first power electrode and a second end of the first heater element to a first control electrode; and connecting a first end of the second heater element to the second power electrode and a second end of the second heater element to a second control electrode.

A further aspect provides an apparatus comprising: a connection that connects a power source to a load; a low melting point body positioned in the connection as part of a protection element, wherein the low melting point body fuses at a melting point and provides increased resistance responsive to heat; and one or more heating elements positioned in the connection as part of a protection element to provide heat to the low melting point body independent of the resistance of the low melting point body.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the invention, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation. It will be readily understood that the methods, systems, computer program products, and apparatuses described in detail herein simply represent example implementations and use contexts, and that the embodiments are equally applicable to other implementations and use contexts.

Embodiments provide for protection elements used in a charge/discharge circuit of certain electronic devices, such as a battery pack, a portable electronic device, or a storage battery equipped device. More specifically, embodiments provide for a storage battery capable of protecting an electronic device when an abnormality occurs during any of charge and discharge of the device. Protection elements according to embodiments are comprised of a low melting point metal body, a first heater element, and a second heater element. Embodiments provide that the first heater element and the second heater element are each placed so as to be thermally coupled to the low melting point metal body. In addition, according to embodiments, thermal coupling provides for a state where heat that allows for fusing is transmitted from the heater element to the low melting point metal body by at least one of radiation and conduction.

A protection element according to embodiments may be comprised of a first power electrode and a second power electrode connectable to the charge/discharge circuit, and a first control electrode and a second control electrode connectable to a switch circuit. Embodiments provide that the protection element components may be connected as follows: (1) the low melting point metal body has one end connected to the first power electrode, and the other end connected to the second power electrode; (2) the first heater element has one end connected to the first power electrode, and the other end connected to the first control electrode; (3) the second heater element has one end connected to the second power electrode, and the other end connected to the second control electrode. Embodiments provide that when the switch circuit operates, a voltage is applied to the first heater element and the second heater element from either a charger or the storage battery. Accordingly, a heating current flows through the first heater element and the second heater element where the voltage is applied. As such, Joule heat is generated to fuse the low melting point metal body.

Embodiments provide that before the low melting point metal body is fused upon reaching a melting point, the low melting point metal body gradually decreases in cross-sectional area and increases in resistance. Since a voltage that is not affected by a voltage drop of the low melting point metal body is applied to one of the first heater element and the second heater element from the charge/discharge circuit, there is no decrease in heat generation amount and so the low melting point metal body can be reliably fused. In addition, the current flows through the other one of the first heater element and the second heater element through the low melting point metal body to cause the other heater element to generate heat, which contributes to the fusing of the low melting point metal body. Furthermore, the current also flows through the low melting point metal body through the other heater element to cause self-heating of the low melting point metal body, which contributes to the fusing. According to embodiments, setting the first heater element and the second heater element to have approximately equal resistances, the protection element can be formed as a symmetrical circuit. As such, it unnecessary to select a polarity when connecting to the charge/discharge circuit.

According to embodiments, a low melting point metal body may be formed of a first block connected to the first power electrode and a second block connected to the second power electrode, wherein the first heater element is placed so as to be thermally coupled to the first block and the second heater element is placed so as to be thermally coupled to the second block, and a resistor has one end connected to a boundary part between the first block and the second block and the other end connected to a third control electrode that is connectable to the switch circuit. Embodiments provide that in order to fuse the low melting point metal body, it is desirable to cause the self-heating by also directing the current flow through the low melting point metal body during the heat generation of the heater elements. With this configuration, there is a possibility that the abnormality of the storage battery expands when a short-circuit current flows through the charge/discharge circuit by turning the switch circuit on. As such, embodiments provide that a resistance of the resistor may be determined so that a maximum permissible current flows through the charge/discharge circuit when the switch circuit operates. As a non-limiting example, the resistance of the resistor may be selected so as to be different from the resistances of the first heater element and the second heater element.

Embodiments provide that by forming the resistor as a heater element and placing the resistor so as to be thermally coupled to the first block and the second block, the resistor can also contribute to the fusing of the low melting point metal. A control circuit operates the switch circuit upon detecting an occurrence of an abnormality in the charge/discharge circuit. According to certain embodiments, the charge/discharge circuit may be provided with a return-type protection circuit in addition to the protection element. As such, upon detecting an abnormality, the control circuit first operates the return-type protection circuit and, when necessary, further operates the switch circuit to use the protection element as a secondary protection circuit. Even after the low melting point metal body is fused, the current continues to flow through any of the heater elements while the switch circuit is on. In addition, embodiments provide that the switch circuit is turned off when a predetermined time has elapsed after the switch circuit is turned on. Alternatively, embodiments provide that the switch circuit may be turned off based on detection of the current of the charge/discharge circuit which varies according to the fusing of the low melting point metal body. Embodiments provide that a protection system including a protection element and switch circuit according to may be provided in the following non-limiting example devices: battery pack, a portable electronic device, or a storage battery equipped device.

The illustrated example embodiments will be best understood by reference to the figures. The following description is intended only by way of example, and simply illustrates certain example embodiments.

Figure 1:
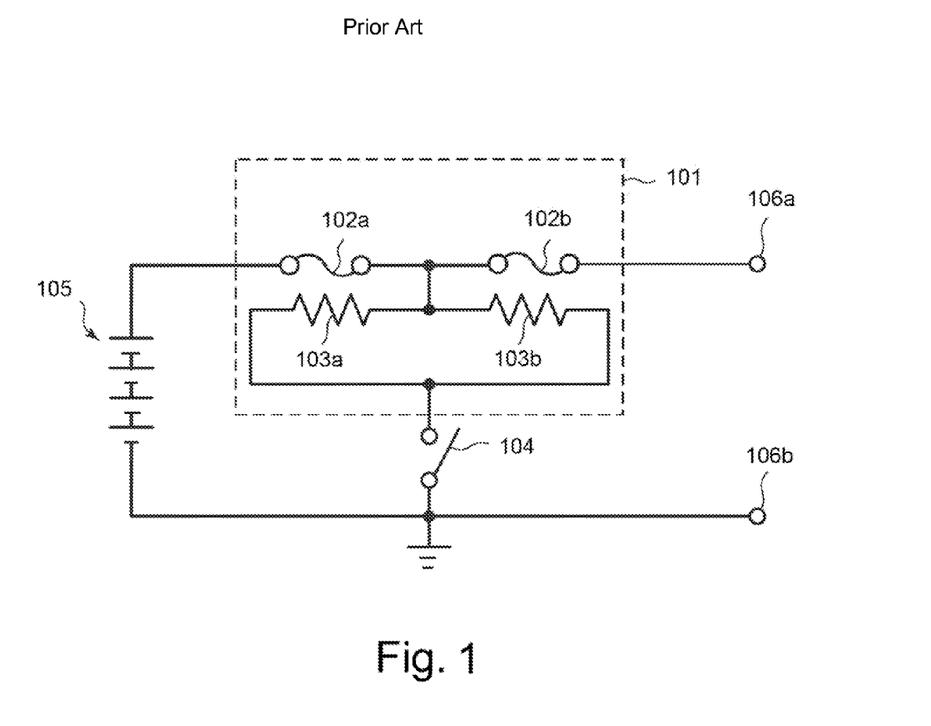
FIG. 1 illustrates an example circuit structure of a conventional protection element.

Referring now to FIG. 1, therein is depicted a circuit structure of a conventional protection element involving a battery pack and a storage battery. A protection element 101 is formed of low melting point metal bodies 102a and 102b and heater elements 103a and 103b. The low melting point metal bodies 102a and 102b are connected in series. One terminal of the low melting point metal bodies 102a and 102b is connected to an output terminal 106a of a battery pack, and the other terminal of the low melting point metal bodies 102a and 102b is connected to a positive electrode of a storage battery 105. The heater elements 103a and 103b are connected in parallel from a central terminal of the low melting point metal bodies 102a and 102b to one terminal of a switch 104. The other terminal of the switch 104 is connected to a negative electrode of the storage battery 105 and a ground line that is connected to an output terminal 106b of the battery pack. The output terminals 106a and 106b of the battery pack are connected to a charger and a load of a system device.

The low melting point metal bodies 102a and 102b and the heater elements 103a and 103b are closely located so as to be thermally coupled to each other. When an abnormal condition occurs in the battery pack having such a protection element 101, the switch 104 is turned on, and the heater elements 103a and 103b generate heat by a current flowing from the positive electrode of the storage battery 105 via the low melting point metal body 102a, thereby heating the low melting point metal bodies 102a and 102b. The heated low melting point metal bodies 102a and 102b increase in temperature, and are fused when the temperature reaches a melting point. Here, as the temperature increases, the low melting point metal body 102a gradually begins to melt, and decreases in cross-sectional area and increases in resistance. When the resistance of the low melting point metal body 102a increases, a voltage applied to the heater elements 103a and 103b drops. This causes a decrease in the amount of heat being generated, making it impossible to supply sufficient heat to the low melting point metal bodies 102a and 102b.

As a result, a state where the low melting point metal bodies 102a and 102b are unable to fuse continues, so that the storage battery cannot be protected properly. In addition, the heat generation of the heater elements 103a and 103b can cause a temperature increase inside the battery pack or melting of a case.

Figure 2:
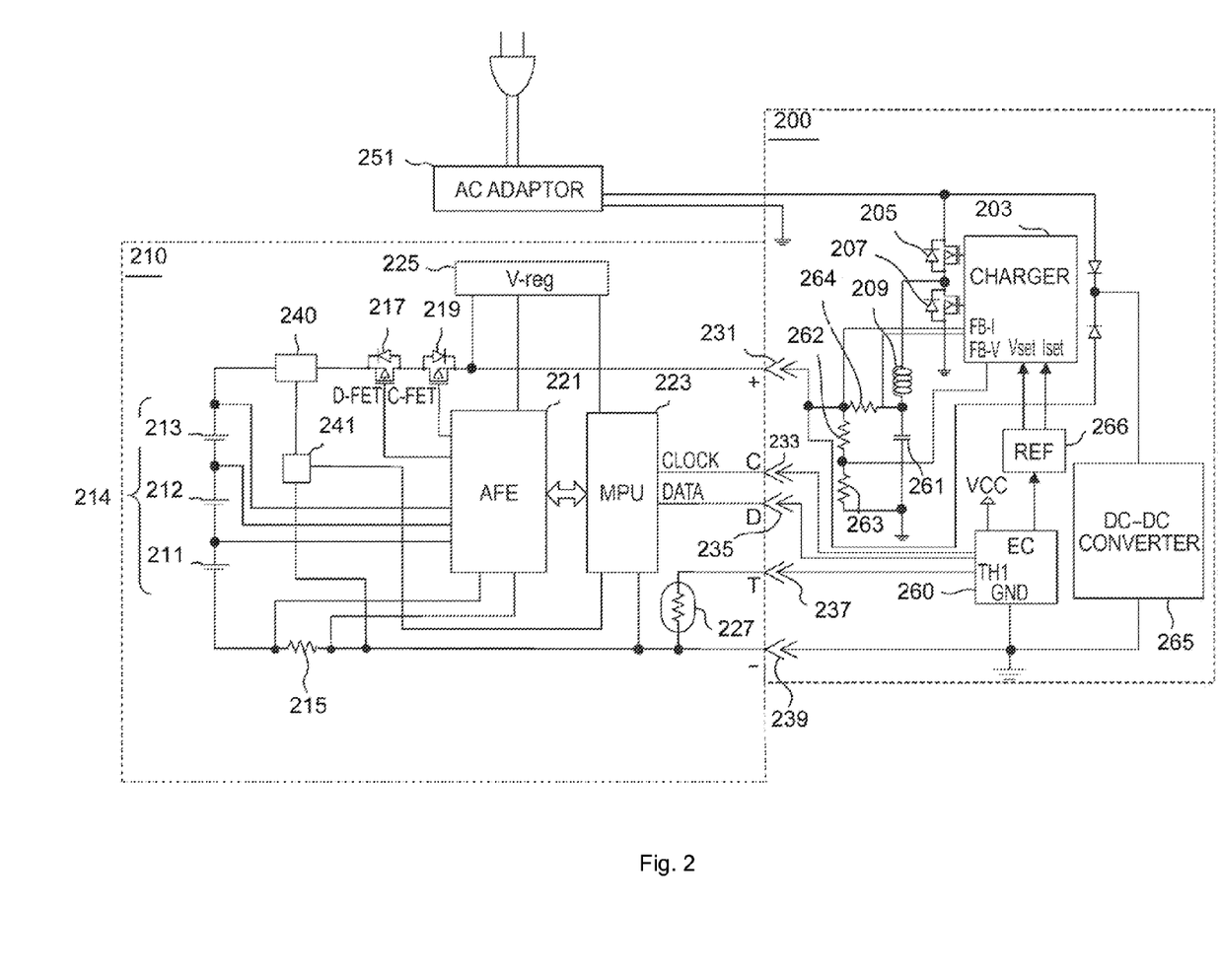
FIG. 2 illustrates an example charge system.

Referring now to FIG. 2, therein is depicted a block diagram showing a charge system according to an embodiment. As a non-limiting example, FIG. 2 illustrates a battery pack, charger, and a system load mounted in a laptop PC. In addition, as a non-limiting example, the battery pack 210 illustrated in FIG. 2 conforms to the Smart Battery System (SBS) specification. According to the embodiment depicted in FIG. 2, the battery pack 210 houses the electronic components including, but not limited to, the following: a storage battery set 214 having three lithium ion storage battery cells 211, 212, 213 connected in series; a sense resistor 215; a FET 217 for protection during discharge; a FET 219 for protection during charge; an AFE (Analog Front End) 221; an Micro Processing Unit (MPU) 223; a voltage regulator 225; a thermistor 227; a protection element 240; and a switch circuit 241.

The embodiment as depicted in FIG. 2 provides that the battery pack 210 and the laptop PC 200 are connected by five terminals: a + terminal 231, a C terminal 233, a D terminal 235, a T terminal 237, and a − terminal 239. The + terminal 231, the FETs 219 and 217, the protection element 240, the storage battery set 214, the sense resistor 215, and the − terminal 239 constitute a charge/discharge circuit in which a charge current to the storage battery set 214 or a discharge current from the storage battery set 214 flows. In addition, the C terminal 233 and the D terminal 235 are connected respectively to a clock terminal and a data terminal of the MPU 223, and the T terminal 237 is connected to the thermistor 227 for measuring an ambient temperature of the storage battery cells 211, 212, 213.

In the embodiment illustrated by FIG. 2, the AFE 221 and the MPU 223 are each an integrated circuit that operate by a constant voltage supplied from the voltage regulator 225. Data exchange is mutually performed between the AFE 221 and the MPU 223. The AFE 221 measures potential differences and is connected to both ends of each of the storage battery cells 211, 212, 213 and both ends of the sense resistor 215. The AFE 221 converts the measured voltages of the storage battery cells 211, 212, 213 to digital values, and sends the digital values to the MPU 223. The AFE 221 is also connected to gates of FETs 217 and 219, and controls on/off of FETs 217 and 219 upon detecting an abnormality in the battery pack 210.

The AFE 221 calculates the charge current and the discharge current flowing in the storage battery set 214 from the potential difference of the sense resistor 215, converts the charge current and the discharge current to digital values, and sends the digital values to the MPU 223. Embodiments provide that the MPU 223 may be an integrated circuit that comprised of a CPU, a RAM, a ROM, a flash memory, a timer, within one package. As a non-limiting example, the CPU may be 8 to 16 bits. According to embodiments, the MPU 223 may monitor the amount of charge and the amount of discharge based on the voltages and currents sent from the AFE 221, and calculate a remaining capacity. In addition, embodiments provide that the MPU 223 may also have an overcurrent protection function, an overvoltage protection function (also referred to as an overcharge protection function), or a low voltage protection function (also referred to as an overdischarge protection function), and may turn off at least one of the FETs 217 and 219 when detecting an abnormality in the battery pack 210 based on the voltage values and current values received from the AFE 221.

According to the embodiment depicted in FIG. 2, the FETs 217 and 219, the AFE 221, and the MPU 223 constitute a return-type protection circuit. The overcurrent protection function, the overvoltage protection function, and the low voltage protection function are realized by a program executed in the MPU 223. A clock line and a data line of the MPU 223 are connected to an embedded controller (EC) 260 in the laptop PC 200 through the C terminal 233 and the D terminal 235, respectively, enabling communication between the MPU 223 and the EC 260. The MPU 223 sets data in a register, and sends a set current and a set voltage to be set in a charger 203 by the EC 260 periodically reading the data. The EC 260 sets the set value in the charger 203 through a reference voltage source 266, thereby controlling an operation of the charger 203. Embodiments provide that designating zero as the set current or the set voltage in the charger 203, the MPU 223 can stop the operation of the charger 203. In addition, embodiments provide that the MPU 223 may stop the operation of the charger 203 upon detecting an abnormality in the battery pack 210 and operating the return-type protection circuit.

As illustrated in FIG. 2, embodiments provide that the protection element 240 includes a low melting point metal body (also referred to as a fuse) and a heater element (also referred to as a heating element), and constitutes, together with the switch circuit 241, a backup non-return-type protection circuit that opens the charge/discharge circuit by fusing the low melting point metal body when the return-type protection circuit does not operate. In addition, embodiments provide that use of the protection element 240 is not limited to backup. The switch circuit 241 for flowing a current to the heater element has one terminal connected to the protection element 240, and the other terminal connected to a ground line on the −terminal 239 side of the sense resistor 215. In addition, a control terminal of the switch circuit 241 is connected to the MPU 223.

According to embodiments, the MPU 223 may stop the charger 203 and operate the return-type protection circuit upon detecting an abnormality in the battery pack 210. Embodiments provide that when determining that the return-type protection circuit does not operate properly or that the abnormality is not removed even though a signal for operating the return-type protection circuit is output, the MPU 223 turns the switch circuit 241 on. When the switch circuit 241 is turned on, the current flows through the heater element, and the low melting point metal body is fused.

Embodiments provide that tower management functions of the laptop PC 200 are realized mainly by the EC 260, in addition to the charger 203, and DC-DC converter 265. The EC 260 is an integrated circuit that controls not only the power supply but also many hardware elements of the laptop PC 200. The EC 260 can obtain information such as the remaining capacity of the storage battery set 214 and the set voltage and the set current to be set in the charger 203, through communication with the MPU 223. The EC 260 receives information of the current flowing through the storage battery set 214 and the voltage across the storage battery set 214, from the MPU 223 during charge and discharge. The EC 260 also detects a resistance of the thermistor 227 that varies according to the temperature in the vicinity of the storage battery cells 211, 212, 213, thereby detecting the temperature. According to embodiments, when there is an abnormality, the EC 260 stops the charger 203 and notifies the MPU 223 of the abnormality. In addition, upon receiving the notification, the MPU 223 turns FETs 217 and 219 off to stop charge/discharge.

Embodiments provide that the charger 203 may also include a switching circuit formed of a FET 205 and a FET 207, and a smoothing circuit formed of an inductor 209 and a capacitor 261. The charger 203 converts a DC voltage input from an AC adaptor 251 to a DC voltage suitable for charging the storage battery set 214 and outputs the converted DC voltage to the battery pack 210, by reducing, by means of the smoothing circuit, pulses of a current output by driving the switching circuit. The charger 203 charges the storage battery set 214 according to a Constant Current Constant Voltage (CC-CV) system. A voltage from the reference voltage source 266 obtained by dividing a constant voltage generated in the laptop PC 200 is input to a current set value input Iset and a voltage set value input Vset of the charger 203.

The reference voltage source 266 inputs the set voltage to the voltage set value input Vset and the set current to the current set value input Iset, based on an instruction from the EC 260. Outputs from voltage dividing resistors 262 and 263 and a sense resistor 217 provided in the laptop PC 200 are connected to a voltage feedback input FB-V and a current feedback input FB-I of the charger 203, and the output voltage and the output current of the charger 203 are input respectively to the voltage feedback input FB-V and the current feedback input FB-I. The DC-DC converter 265 converts a DC voltage received from the AC adaptor 251 or a DC voltage received from the storage battery set 214 to a predetermined voltage, and supplies the predetermined voltage to the system load (not shown) in the laptop PC 200.

Figure 3:
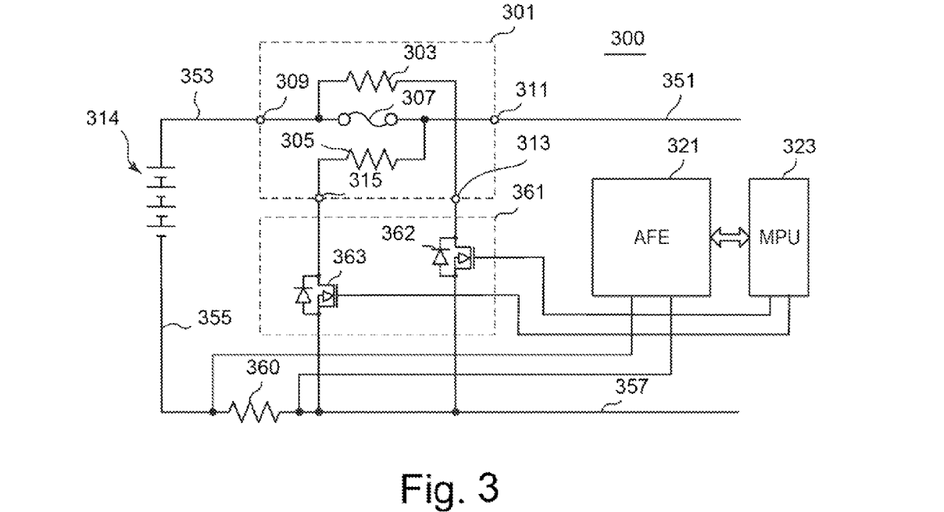
FIG. 3 illustrates an example non-return-type protection circuit.

Referring now to FIG. 3, therein is depicted a block diagram of a non-return-type protection circuit according to embodiments. As illustrated in FIG. 3, embodiments provide that the non-return-type protection circuit 300 may be composed of a protection element 301, switch circuit 361, sense resistor 360, AFE 321, and MPU 323. In addition, embodiments provide that the protection element 301 also includes a low melting point metal body 307 and heater elements 303 and 305 that are each thermally coupled to the low melting point metal body 307.

The low melting point metal body 307, according to embodiments, is an element that is fused by a temperature increase, and has one end connected to an electrode 309 and the other end connected to an electrode 311. The low melting point metal body 307 is also fused by Joule heat generated by a current flowing through the low melting point metal body 307 itself in the charge/discharge system. Typically, an excessively large current flows in the charge/discharge circuit in a short time even during normal conditions. As such, a current that allows for fusing is extremely large. Accordingly, embodiments provide that in order to function as a protection element, it is necessary to heat the low melting point metal body 307 externally by the heater elements 303 and 305. As such, embodiments provide that the heater elements 303 and 305 are each made by a resistor, and have one end connected respectively to the electrodes 309 and 311 and the other end connected respectively to electrodes 313 and 315. In addition, the heater elements 303 and 305 are placed so as to face the low melting point metal body 307 planarly, with an insulator (not shown) interposed therebetween. Furthermore, the heater elements 303 and 305 are thermally coupled to the low melting point metal body 307 so that heat of the heater elements 303 and 305 when increasing in temperature is transmitted to the low melting point metal body 307.

According to embodiments, the heater elements 303 and 305 may be set to have equal resistances so that the protection element 301 forms a symmetrical circuit with respect to the electrodes 309 and 311, or may be set to have different resistances based on an estimated voltage of the storage battery set 314 and an estimated voltage of the charger 303 at the time of abnormality so that a predetermined amount of heat generation is attained. For the non-limiting example of setting the equal resistances, embodiments provide that it is possible to eliminate directionality for a charger side line 351 and a storage battery side line 353 of the electrodes 309 and 311, which contributes to convenient handling.

Embodiments provide that the switch circuit 361 includes n-channel MOSFETs 362 and 363. The FET 362 has a drain connected to the electrode 313, and a source connected to a ground line 357. The FET 363 has a drain connected to the electrode 315, and a source connected to the ground line 357. The sense resistor 360 is connected to a storage battery side line 355 and the ground line 357.

Referring now to FIGS. 2 and 3, the following provides a non-limiting example of the operation of a non-return-type protection circuit according to embodiments. In the charge/discharge system shown in FIG. 2, while the charger 203 charges the storage battery set 214 or while the storage battery set 214 discharges to supply power to the DC-DC converter 265, an abnormality such as an overvoltage, an overcurrent, or a low voltage may occur in the battery pack 210. In this non-limiting example, embodiments provide that the MPU 223 turns the FETs 217 and 219 off through the AFE 221, and stops the operation of the charger 203 through the EC 260. The MPU 223 monitors a subsequent voltage and current, and checks whether or not the FETs 217 and 219 are off.

When the FETs 217 and 219 are not off, the abnormal condition of the battery pack 210 continues. Accordingly, referring now to FIG. 3, the MPU 323 turns the FETs 353 and 355 on.

Referring now to FIG. 2, in the non-limiting example where the charger 203 is stopped, embodiments provide that the storage battery set 214 applies a voltage to the protection element 201 via the battery side line 253. As such, as depicted in FIG. 3, a voltage between the electrode 309 and the ground line 357 is applied to the heater element 303, so that a heating current flows to the heater element 303 and Joule heat is generated. In addition, a voltage between the electrode 311 and the ground line 357 is applied to the heater element 305, so that a heating current flows to the heater element 305 via the low melting point metal body 307 and Joule heat is generated.

According to embodiments, in the non-return-type protection circuit 300, the voltage of the storage battery set 314 changes between a charge stop voltage and a discharge stop voltage. As non-limiting examples, a charge stop voltage may be 12.6 V and a discharge stop voltage may be 8.1 V. The resistances of the heater elements 303 and 305 are selected so that the amount of heat generation necessary for fusing is attained when the minimum voltage is applied. As a non-limiting example, a minimum voltage may be 8.1 V. According to embodiments, when the FETs 362 and 363 are turned on, the heating current flows to the heater element 303, and the heating current flows to the heater element 305 via the low melting point metal body 307, as a result of which each of the heater elements 303 and 305 supplies heat to the low melting point metal body 307. In addition, the low melting point metal body 307 generates heat itself, by the heating current flowing to the heater element 305.

Embodiments provide that when the temperature of the low melting point metal body 307 reaches a melting point, the low melting point metal body 307 begins to melt from its periphery, and gradually decreases in cross-sectional area and increases in resistance. When the resistance of the low melting point metal body 307 increases, the voltage applied to the heater element 305 decreases due to a voltage drop of the low melting point metal body 307, making it impossible to supply sufficient heat to the low melting point metal body 307. However, since the voltage applied to the heater element 303 is not affected by the resistance increase of the low melting point metal body 307, the heater element 303 supplies sufficient heat, thereby enabling the low melting point metal body 307 to be fused. According to embodiments, the self-heating by the current flowing through the low melting point metal body 307 and the heat generated by the current flowing through the heater element 305 also contribute to the fusing as auxiliary heat.

Embodiments provide that in the protection element 301, the low melting point metal body 307 can be reliably fused by turning the switch circuit 351 on. After the low melting point metal body 307 is fused, the storage battery set 314 continues to discharge through the heater element 303 and the FET 362. In addition, embodiments provide that the timer in the MPU 323 measures a predetermined time after the switch circuit 361 is turned on, and then turns the FETs 362 and 363 off. A non-limiting example of a predetermined time is 30 seconds. Embodiments further provide that the predetermined time can be set as a maximum time to cause fusing as guaranteed by the protection element 301 in the non-return-type protection circuit 300.

After the low melting point metal body 307 is fused embodiments are configured to turn the switch circuit 361 off as early as possible. During a period from when the switch circuit 361 turns on to when the low melting point metal body 307 is fused, the heater elements 303 and 305 are connected in parallel to the discharge circuit as seen from the storage battery set 314. After the low melting point metal body 307 is fused, only the heater element 303 is connected to the discharge circuit. Accordingly, the discharge current sharply decreases once the low melting point metal body 307 has been fused. Embodiments provide that the MPU 323 may detect this current change to detect the fusing of the low melting point metal body 307, and turn the switch circuit 361 off.

Referring now to FIG. 2, in the non-limiting example where the operation of the charger 203 does not stop at the time of abnormality or an abnormality occurs during charge, a voltage is applied to the protection element 240 from the charger 203. As depicted in FIG. 3, this voltage is applied through the charger side line 351. Referring again to FIG. 2, where the voltage at the time of abnormality is applied from the charger 203, embodiments provide that the protection element 240 can reliably fuse the low melting point metal body, depicted by 307 in FIG. 3, where the voltage is applied from the storage battery set 214. As depicted in FIG. 3, in this embodiment, the heater element 305 functions as a main heater element not affected by the voltage drop of the low melting point metal body 307, and the heater element 303 functions as an auxiliary heater element. In addition, the self-heating by the current flowing through the low melting point metal body 307 via the heater element 303 equally contributes to the fusing. Embodiments provide that MPU 323 may recognize whether the voltage is applied to the protection element 301 from the charger side line 351 or the battery side line 353 when the switch circuit 361 operates, and turn off only the FET 362, 363 relating to the heater element connected to the electrode to which the voltage is applied.

Figure 4:
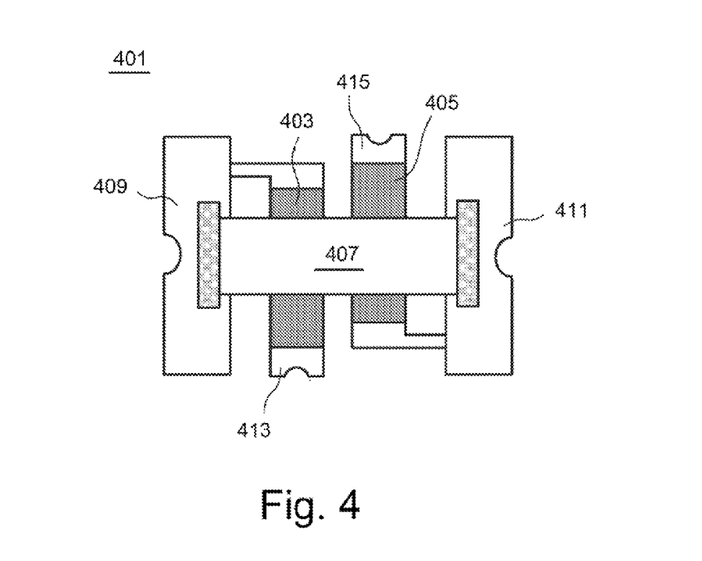
FIG. 4 illustrates an example protection element.

Referring now to FIG. 4, therein is depicted a protection element according to an embodiment. The protection element 401 includes a low melting point metal body 407 and heater elements 403 and 405 that are each thermally coupled to the low melting point metal body 407. The embodiment depicted in FIG. 4 also depicts heater elements 403 and 405 connected to electrodes 413 and 415, respectively. In addition, the low melting point metal body 407, an element that is fused by a temperature increase, has one end connected to an electrode 409 and the other end connected to an electrode 411.

Figure 5A:
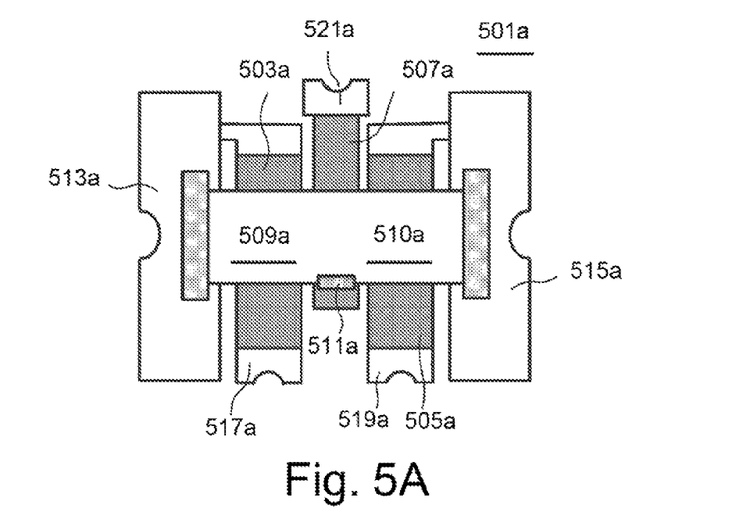
FIG. 5A illustrates an example protection element.
Figure 5B:
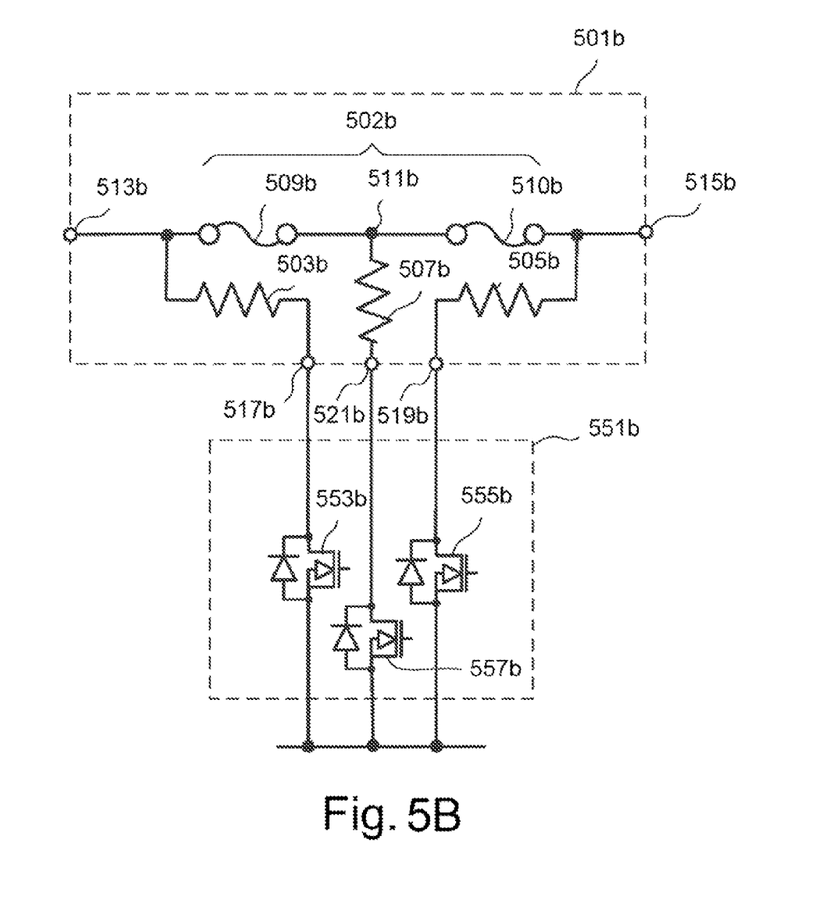
FIG. 5B illustrates an example protection element.

Referring now to FIGS. 5A and 5B, therein is depicted a block diagram and a circuit diagram, respectively, of a protection element according to further embodiments. The following description refers to elements of both FIGS. 5A and 5B.

A protection element 501a can be used in the non-return-type protection circuit according to embodiments in combination with a switch circuit 551b, in the same way as the protection element as depicted in FIG. 3 by element 301. In addition, the protection element 501a forms a symmetrical circuit with respect to electrodes 513a and 515a. Furthermore, the protection element 501a reliably fuses a low melting point metal body 502b by Joule heat, from whichever power source out of a charger and the storage battery set the voltage is applied at the time of abnormality according to embodiments. Referring now specifically to FIG. 5B, blocks 509b and 510b can be defined in the low melting point metal body 502b. The electrode 513b is connected to the block 509b, and the electrode 515b is connected to the block 510b. Referring now to FIGS. 3 and 5B, embodiments provide that the electrode 513b is connected to the storage battery side line 353 of FIG. 3, and the electrode 515b is connected to the charger side line 351 of FIG. 3.

Referring again to FIG. 5B, embodiments provide that a heater element 503b is connected to the electrode 513b and an electrode 517b, and placed so as to be thermally coupled to the block 509b. A heater element 505b is connected to the electrode 515b and an electrode 519b, and placed so as to be thermally coupled to the block 509b. According to embodiments, even though the heater elements 503b and 505b are set to have equal resistances, they may be set to have different resistances as mentioned earlier with regard to the protection element 241 of FIG. 2. As depicted in FIG. 5B, embodimnts provide that one end of a limiting resistor 507b may be connected to an intermediate part 511b located at a boundary between the blocks 509b and 510b, and the other end of the limiting resistor 507b may be connected to an electrode 521b.

According to embodiments, when the switch circuit 551b is turned on, the limiting resistor 507b serves to flow a sufficient current for assisting the fusing, while preventing an excessively large current from flowing in the charge/discharge circuit. The limiting resistor 507b need not be thermally coupled to the blocks 509b and 510b. Alternatively, the limiting resistor 507b may be formed as a heater element and placed so as to be thermally coupled to the low melting point metal body 509b, thereby directly contributing to the fusing. The switch circuit 551b includes three n-channel MOSFETs 553b, 555b, and 557b connected respectively to the electrodes 517b, 519b, and 521b.

As further illustrated in FIG. 5B, embodiments provide that the drains of the FETs 553b, 555b, and 557b are connected respectively to the electrodes 517b, 519b, and 521b, and sources of the FETs 553b, 555b, and 557b are connected to the ground line 357 in FIG. 3. Gates of the FETs 553b, 555b, and 557b are connected to the MPU 323 of FIG. 3. According to embodiments, the MPU 323 of FIG. 3 may be configured to simultaneously turn on the FETs 553b, 555b, and 557b in the switch circuit 551b when an abnormality is detected in the charge/discharge circuit, and simultaneously turns off the FETs 553b, 555b, and 557b when the predetermined time has elapsed or the fusing of the low melting point metal body 502b is detected. A resistance of the limiting resistor 507b is determined by a maximum permissible current in the charge/discharge circuit, and therefore is different from resistances of the heater elements 503b and 505b. According to embodiments, MPU 323 of FIG. 3 may recognize whether the voltage is applied to the protection element 501b from the charger side line 351 of FIG. 3 or the battery side line 353 of FIG. 3 when the switch circuit 551b operates, and turn off only the FET relating to the heater element connected to the electrode to which the voltage is applied.

In the non-limiting case where the voltage is applied from the electrode 513b when the switch circuit 551b is turned on, embodiments provide that the voltage applied to the heater element 503b is not affected by a voltage drop of the blocks 509b and 510b, and therefore the heater element 503b can supply sufficient heat to the block 509b to cause fusing. According to the embodiment depicted in FIG. 5B, a heating current limited in the limiting resistor 507b and the heater element 505b is flown to the block 509b, so that the self-heating of the block 509b assists the fusing. In the non-limiting example where the voltage is applied from the electrode 515b when the switch circuit 551b is turned on, embodiments provide that the heater element 505b can supply sufficient heat to the block 510b to cause fusing. In this embodiment, the self-heating of the block 510b by a heating current flowing through the limiting resistor 507b and the heater element 503b assists the fusing.

In the non-limiting example of not providing the limiting resistor 507b, the protection element 501b has the same structure as the protection element 240 of FIG. 2. According to embodiments, when the switch circuit 551b operates, the low melting point metal body 509b is fused as early as possible. Embodiments provide for this fusing by also directing a large current within a permissible range through the low melting point metal body 509b. Referring now to FIG. 3, in the protection element 301, the resistances of the two heater elements 303 and 305 are determined according to the heat generation amount, and so the current flowing through the low melting point metal body 307 cannot be selected freely. Referring again to FIG. 5B, the resistance of the limiting resistor 507b in the protection element 501b can be determined independently of the resistances of the heater elements 503b and 505b, so that the current flowing through the low melting point metal body can be set freely.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those particular descriptions, and that various other changes and modifications may be affected therein by one skilled in the art without departing from the scope or spirit of the disclosure.

What is claimed is:

1. An apparatus comprising:
   one or more charge/discharge units;
   one or more switch circuits;
   a plurality of power electrodes connectable to the one or more charge/discharge units;
   a plurality of control electrodes connectable to the one or more switch circuits;
   a low melting point metal body, wherein a first end of the low melting point metal body is connected to a first power electrode and a second end of the low melting point body is connected to a second power electrode;
   a first heater element thermally coupled to the low melting point metal body, wherein a first end of the first heater element is connected to the first power electrode and a second end of the first heater element is connected to a first control electrode; and
   a second heater element thermally coupled to the low melting point metal body, wherein a first end of the second heater element is connected to the second power electrode and a second end of the second heater element is connected to a second control electrode.

2. The apparatus according to claim 1, further comprising:
   a control circuit;
   wherein the control circuit is configured to operate the one or more switch circuits upon detecting an abnormality in the one or more charge/discharge circuits.

3. The apparatus according to claim 1, wherein the first heater element and the second heater element have approximately equal resistances.

4. The apparatus according to claim 1, wherein the low melting point metal body comprises a first block and a second block, the first block connected to the first power electrode and the second block connected to the second power electrode.

5. The apparatus according to claim 4, wherein the first heater element is thermally coupled to the first block and the second heater element is thermally coupled to the second block.

6. The apparatus according to claim 5, further comprising:
a third control electrode connectable to the switch circuit; and
a resistor having a first end connected to a boundary part between the first block and the second block and a second end connected to the third control electrode.

7. The apparatus according to claim 6, wherein the resistor has a resistance different from resistances of the first heater element and the second heater element.

8. The apparatus according to claim 1, wherein the one or more switch circuits are configured to operate such that a voltage is applied to the first heater element and the second heater element;
wherein a heating current arises when the voltage is applied to the first heater element and the second heater element, the heating current generating Joule heat that fuses the low melting point body.

9. The apparatus according to claim 8, wherein the low melting point body fuses upon reaching a melting point.

10. The apparatus according to claim 8, wherein the Joule heat causes the low melting point metal body to gradually decrease in cross-sectional area and increase in resistance before fusing.

11. A method comprising:
providing a plurality of power electrodes connectable to one or more charge/discharge units;
providing a plurality of control electrodes connectable to one or more switch circuits;
connecting a first end of a low melting point metal body to a first power electrode and a second end of the low melting point body to a second power electrode;
thermally coupling a first heater element and a second heater element to the low melting point metal body;
connecting a first end of the first heater element to the first power electrode and a second end of the first heater element to a first control electrode; and
connecting a first end of the second heater element to the second power electrode and a second end of the second heater element to a second control electrode.

12. The method according to claim 11, further comprising:
configuring a control circuit to operate the one or more switch circuits upon detecting an abnormality in the one or more charge/discharge circuits.

13. The method according to claim 11, wherein the first heater element and the second heater element have approximately equal resistances.

14. The method according to claim 11, wherein the low melting point metal body comprises a first block and a second block, the first block connected to the first power electrode and the second block connected to the second power electrode.

15. The method according to claim 14, wherein the first heater element is thermally coupled to the first block and the second heater element is thermally coupled to the second block.

16. The method according to claim 15, further comprising:
providing a third control electrode connectable to the switch circuit; and
connecting a first end of a resister to a boundary between the first block and the second block and a second end connected to the third control electrode.

17. The method according to claim 16, wherein the resistor has a resistance different from resistances of the first heater element and the second heater element.

18. The method according to claim 11, wherein the one or more switch circuits are configured to operate such that a voltage is applied to the first heater element and the second heater element;
wherein a heating current arises when the voltage is applied to the first heater element and the second heater element, the heating current generating Joule heat that fuses the low melting point body.

19. The method according to claim 18, wherein the low melting point body fuses upon reaching a melting point.

20. An apparatus comprising:
a connection that connects a power source to a load;
a low melting point body positioned in the connection as part of a protection element, wherein the low melting point body fuses at a melting point and provides increased resistance responsive to heat; and
one or more heating elements positioned in the connection as part of a protection element to provide heat to the low melting point body independent of the resistance of the low melting point body.

* * * * *